(12) United States Patent
Lee et al.

(10) Patent No.: US 9,466,424 B2
(45) Date of Patent: Oct. 11, 2016

(54) PASTE FOR EXTERNAL ELECTRODE, MULTILAYER CERAMIC ELECTRONIC COMPONENT, AND METHOD OF MANUFACTURING THE SAME

(71) Applicant: SAMSUNG ELECTRO-MECHANICS CO., LTD., Suwon-Si, Gyeonggi-Do (KR)

(72) Inventors: Chung Eun Lee, Suwon-Si (KR); Doo Young Kim, Suwon-Si (KR); Hang Kyu Cho, Suwon-Si (KR); Jong Ho Lee, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 141 days.

(21) Appl. No.: 14/340,422

(22) Filed: Jul. 24, 2014

(65) Prior Publication Data
US 2015/0318111 A1 Nov. 5, 2015

(30) Foreign Application Priority Data
Apr. 30, 2014 (KR) .......... 10-2014-0052866

(51) Int. Cl.
| | |
|---|---|
| *H01G 4/12* | (2006.01) |
| *H01G 4/012* | (2006.01) |
| *H01G 4/248* | (2006.01) |
| *H01G 4/008* | (2006.01) |
| *H01G 4/232* | (2006.01) |
| *H01G 4/30* | (2006.01) |

(52) U.S. Cl.
CPC ............. *H01G 4/012* (2013.01); *H01G 4/008* (2013.01); *H01G 4/12* (2013.01); *H01G 4/1218* (2013.01); *H01G 4/232* (2013.01); *H01G 4/2325* (2013.01); *H01G 4/248* (2013.01); *H01G 4/30* (2013.01); *Y10T 29/42* (2015.01)

(58) Field of Classification Search
CPC ........ H01G 4/30; H01G 4/232; H01G 4/012; H01G 4/2325; H01G 4/008; H01G 4/005; H01G 4/228; H01G 4/242
See application file for complete search history.

(56) References Cited

U.S. PATENT DOCUMENTS

| | | | | |
|---|---|---|---|---|
| 6,002,577 | A * | 12/1999 | Wada ..................... | H01G 4/232 361/303 |
| 6,344,963 | B1 * | 2/2002 | Mori ...................... | H01G 4/232 361/305 |
| 6,349,026 | B1 * | 2/2002 | Nakamura .............. | B32B 18/00 361/303 |
| 2009/0154055 | A1 * | 6/2009 | Takashima ............... | H01G 4/30 361/301.4 |
| 2009/0284898 | A1 * | 11/2009 | Kusano ................. | C04B 35/457 361/305 |
| 2012/0154977 | A1 | 6/2012 | Hur et al. | |

FOREIGN PATENT DOCUMENTS

| | | |
|---|---|---|
| EP | 2 117 008 A1 | 11/2009 |
| KR | 10-2003-0037351 A | 5/2003 |
| KR | 10-2009-0106409 A | 10/2009 |
| KR | 10-2012-0068622 A | 6/2012 |

* cited by examiner

*Primary Examiner* — Dion R Ferguson
(74) *Attorney, Agent, or Firm* — McDermott Will & Emery LLP

(57) ABSTRACT

A multilayer ceramic electronic component may include: a ceramic body including a plurality of dielectric layers; internal electrodes disposed in the ceramic body and having one ends exposed to outer surfaces of the ceramic body; and external electrodes disposed on the outer surfaces of the ceramic body to be connected to the respective one ends of the internal electrodes and containing a conductive metal and a conductive ceramic powder.

7 Claims, 4 Drawing Sheets

PASTE FOR EXTERNAL ELECTRODE, MULTILAYER CERAMIC ELECTRONIC COMPONENT, AND METHOD OF MANUFACTURING THE SAME

CROSS-REFERENCE TO RELATED APPLICATION

This application claims the benefit of Korean Patent Application No. 10-2014-0052866 filed on Apr. 30, 2014, with the Korean Intellectual Property Office, the disclosure of which is incorporated herein by reference.

BACKGROUND

The present disclosure relates to a paste for an external electrode, a multilayer ceramic electronic component, and a method of manufacturing the same.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes formed on surfaces of the ceramic body to be connected to the internal electrodes.

In accordance with the electronization of various functions in applications requiring high degrees of reliability and increases in demands thereon, in response thereto, demands also have been made for multilayer ceramic electronic components having high reliability.

In connection with external electrodes of the multilayer ceramic electronic component, implementation of densification of the external electrode and adhesion properties with respect to internal electrodes may be factors considered in order to implement high reliability.

In addition, in order to implement electrical properties of the multilayer ceramic electronic component, contact resistance between the internal electrode and the external electrode needs to be decreased.

RELATED ART DOCUMENT (Patent Document 1) Korean Patent Laid-Open Publication No. 2012-0068622

SUMMARY

An exemplary embodiment in the present disclosure may provide a paste for an external electrode, a multilayer ceramic electronic component, and a method of manufacturing the same.

According to an exemplary embodiment in the present disclosure, a multilayer ceramic electronic component may include: a ceramic body including a plurality of dielectric layers; internal electrodes disposed in the ceramic body and having one ends exposed to outer surfaces of the ceramic body; and external electrodes disposed on the outer surfaces of the ceramic body to be connected to the respective one ends of the internal electrodes and containing a conductive metal and a conductive ceramic powder.

The external electrodes may be formed of a paste for an external electrode containing a conductive metal and a conductive ceramic powder, and the conductive ceramic powder may be contained in the external electrode in an amount of 3 wt % to 20 wt %.

According to an exemplary embodiment in the present disclosure, a method of manufacturing a multilayer ceramic electronic component may include: preparing a plurality of ceramic green sheets; forming internal electrode patterns on the ceramic green sheets; forming a ceramic body in which dielectric layers and internal electrodes are alternately stacked, by stacking and sintering the ceramic green sheets; applying a paste for an external electrode containing a conductive ceramic powder and a conductive metal powder to outer surfaces of the ceramic body to be connected to one ends of the internal electrodes; and forming external electrodes by sintering the paste for an external electrode.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
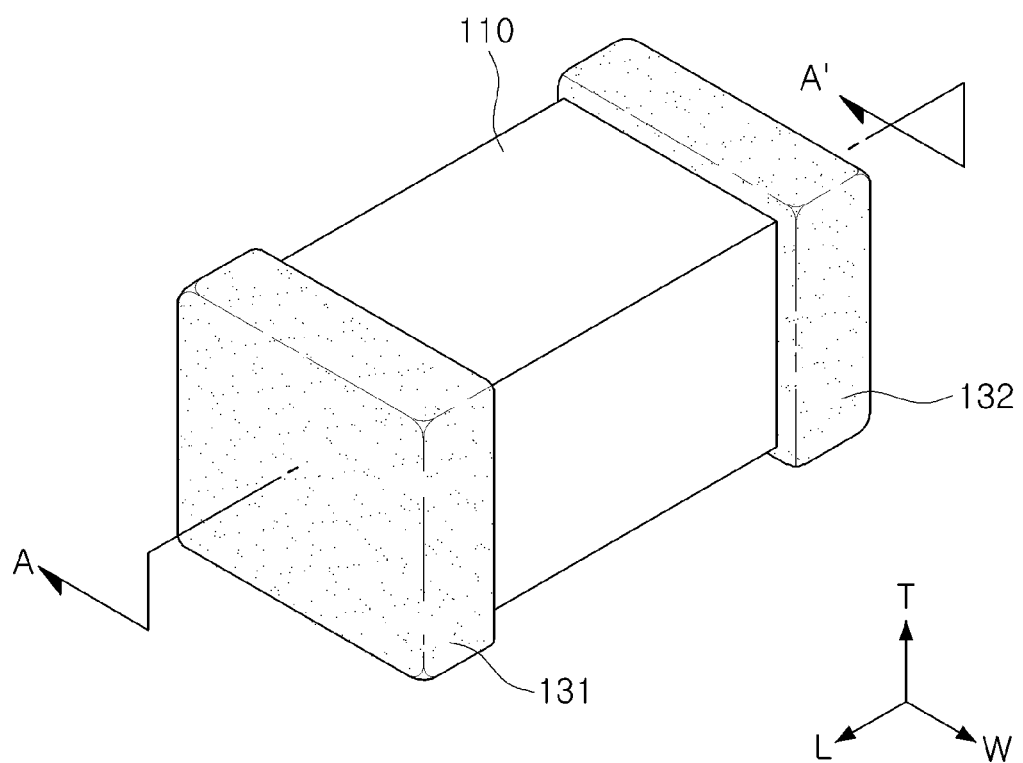
FIG. 1 is a perspective view showing a multilayer ceramic electronic component 100 according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
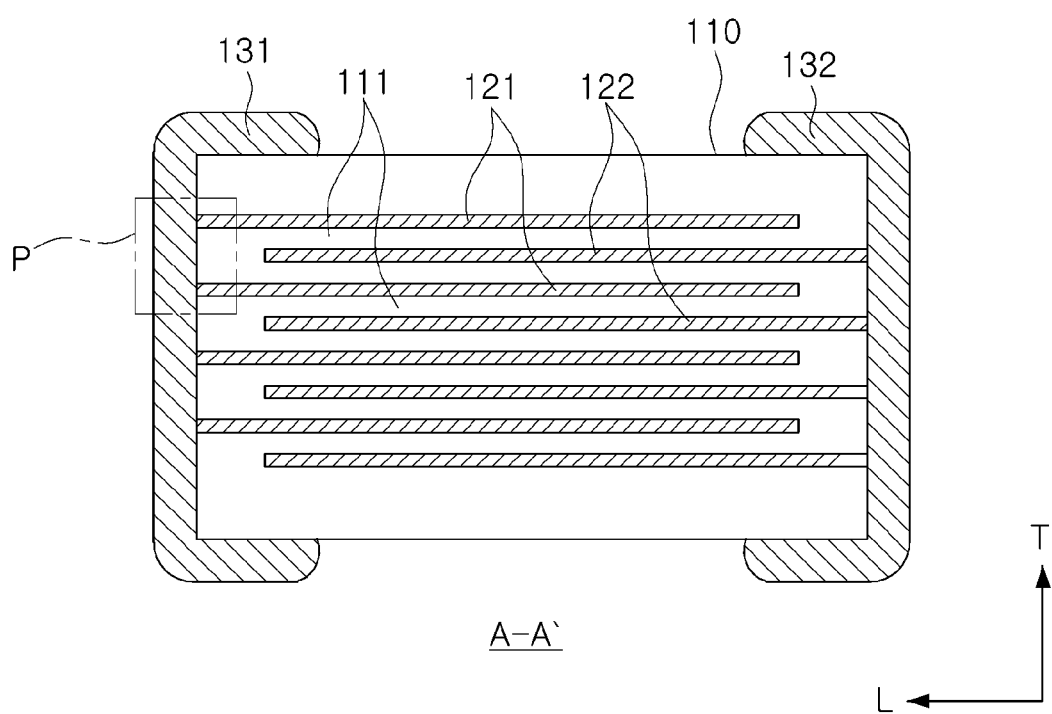
FIG. 2 is a cross-sectional view taken along line A-A' of FIG. 1.

FIG. 1 is a perspective view showing a multilayer ceramic electronic component 100 according to an exemplary embodiment of the present disclosure, and FIG. 2 is a cross-sectional view taken along line A-A' of FIG. 1.

Referring to FIGS. 1 and 2, the multilayer ceramic electronic component 100 according to an exemplary embodiment of the present disclosure may include a ceramic body 110; and external electrodes 131 and 132.

The ceramic body 110 may include an active layer as a portion contributing to capacitance formation of a capacitor and upper and lower cover layers formed on upper and lower portions of the active layer as upper and lower margin parts, respectively. The active layer may include dielectric layers 111 and internal electrodes 121 and 122 and be formed by stacking the dielectric layers 111 on which the internal electrodes 121 and 122 are printed.

In an exemplary embodiment of the present disclosure, a shape of the ceramic body 110 is not particularly limited, but may be substantially a hexahedral shape. A difference in a thickness is generated according to the sintering shrinkage of a ceramic powder at the time of sintering a chip and the presence or absence of an internal electrode pattern, and edge parts of the ceramic body are polished, such that the ceramic body 110 does not have a perfect hexahedral shape but may have a substantially hexahedral shape.

Directions of the ceramic body will be defined in order to clearly describe exemplary embodiments of the present disclosure. L, W and T shown in the accompanying drawings refer to a length direction, a width direction, and a thickness direction, respectively. Here, the thickness direction may be the same as a stacking direction in which dielectric layers are stacked.

The internal electrodes 121 and 122 may be alternately stacked with the dielectric layers 111 interposed therebetween and be insulated from each other by the dielectric layers.

The internal electrodes 121 and 122 may include a first internal electrode 121 and a second internal electrode 122, and one ends of the internal electrodes 121 and 122 may be exposed to outer surfaces of the ceramic body to thereby be electrically connected to the external electrodes.

The internal electrodes may be electrically connected to the external electrodes 131 and 132 through portions thereof exposed to the outer surfaces of the ceramic body 110. The external electrode may include a first external electrode 131 and a second external electrode 132, the first internal electrode 121 may be electrically connected to the first external electrode 131, and the second internal electrode 122 may be electrically connected to the second external electrode 132.

A thickness of the internal electrodes 121 and 122 and the number of stacked internal electrodes 121 and 122 may be determined according to the use thereof.

Further, a conductive metal contained in the first and second internal electrodes 121 and 122 may be nickel (Ni), copper (Cu), palladium (Pd), or an alloy thereof, but the present disclosure is not limited thereto.

In this case, a thickness of the dielectric layers 111 may be suitably changed according to a capacitance design of the multilayer ceramic capacitor.

Further, the dielectric layers 111 may contain a ceramic powder having high permittivity, for example, a barium titanate ($BaTiO_3$) based powder or a strontium titanate ($SrTiO_3$) based powder, or the like, but the present disclosure is not limited thereto.

The upper and lower cover layers may have the same material and configuration as those of the dielectric layers 111 except that internal electrodes are not included therein. The upper and lower cover layers may be formed by disposing a single or two or more dielectric layers on upper and lower surfaces of the active layer in a vertical direction, respectively, and serve to prevent the internal electrodes 121 and 122 from being damaged by physical or chemical stress.

The external electrodes 131 and 132 may be directly connected to the internal electrodes 121 and 122 to secure electrical connection between the external electrode and the internal electrode.

The external electrodes 131 and 132 may contain a conductive metal 30a, a conductive ceramic powder 30b, and a glass component 30c. The external electrodes 131 and 132 may be formed of a paste for an external electrode containing a metal powder, a conductive ceramic powder, and a glass component. In the paste for an external electrode, the glass component may be contained in a glass frit form. The external electrodes may be sintered type electrodes formed by sintering the paste for an external electrode.

Figure 3:
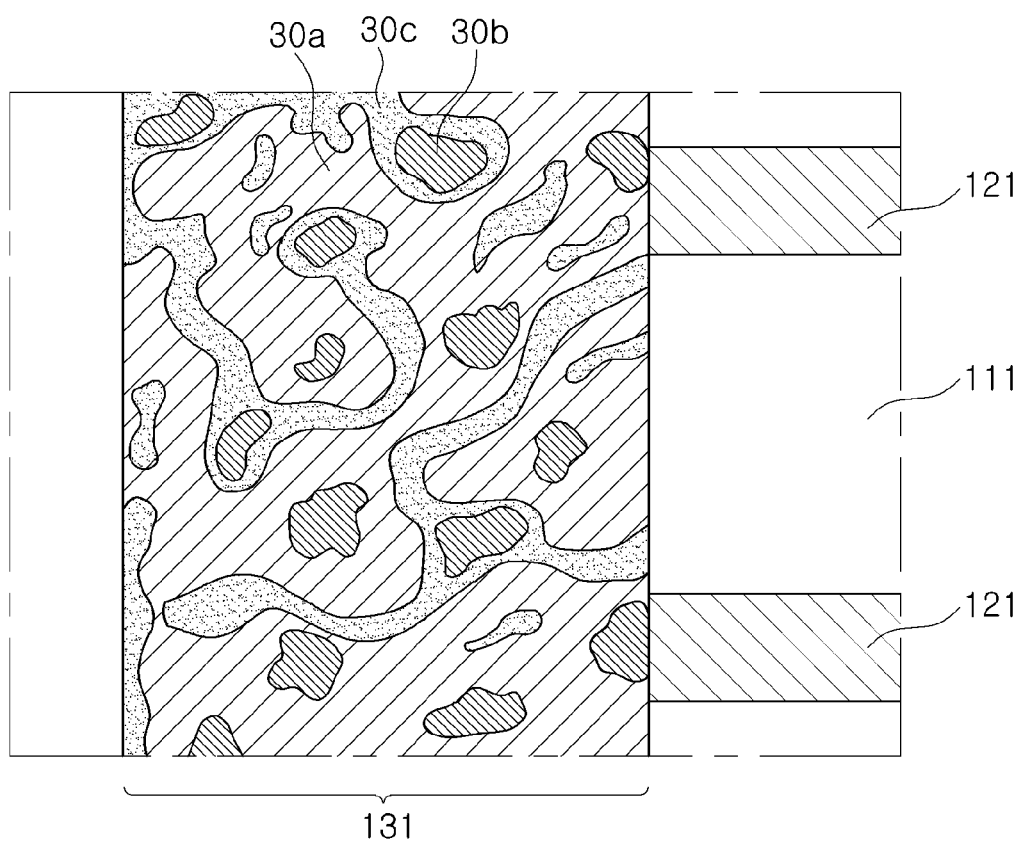
FIG. 3 is an enlarged view of part P of FIG. 2.

FIG. 3 is an enlarged view of part P of FIG. 2.

Referring to FIG. 3, the external electrodes may contain the conductive metal 30a, the conductive ceramic powder 30b, and the glass component 30c.

The conductive metal 30a contained in the external electrode may mainly serve to transfer a current applied to the external electrodes 131 and 132 to the internal electrodes 121 and 122.

The conductive metal may be nickel (Ni), copper (Cu), palladium (Pd), gold (Au), silver (Ag), or an alloy thereof, but the present disclosure is not limited thereto.

The glass component 30c may be contained in order to densify the external electrode. The glass component may contain $SiO_2$ based glass, $B_2O_3$ based glass, or both of the $SiO_2$ based glass and $B_2O_3$ based glass, but is not limited thereto.

For example, the glass component may contain a composition of $aSiO_2$-$bB_2O_3$-$cR^1{}_2O$ or $aSiO_2$-$bB_2O_3$-$dR^2O$, but is not limited thereto. $R^1$ may be selected from a group consisting of lithium (Li), sodium (Na), and potassium (K), $R^2$ may be selected from a group consisting of magnesium (Mg), calcium (Ca), strontium (Sr), and barium (Ba), and a, b, c, and d may be appropriately adjusted depending on desired physical properties of the glass component.

Contents of the conductive metal 30a and the glass component 30c may be appropriately adjusted according to properties of the external electrode.

The conductive ceramic powder 30b may serve to delay the sintering of the paste for an external electrode when the external electrode is formed by a sintering process.

In the case in which the sintering of the paste for an external electrode is excessively rapidly performed, it may be difficult to implement densification of the external electrode, and the external electrode may not be closely adhered to the ceramic body but be delaminated from the ceramic body.

Generally, since a ceramic material has a high melting point as compared to glass or a metal contained in an external electrode, in the case of sintering the paste for an external electrode containing the ceramic powder to form the external electrode, a sintering rate of the external electrode may be decreased.

However, since a general ceramic material has non-conductivity, in the case in which non-conductive ceramic powder is contained in the paste for an external electrode, contact resistance between the internal electrode and the external electrode may be increased.

Particularly, the non-conductive ceramic powder contained in the external electrode is present in an exposed portion of the internal electrode, a contact portion between the internal electrode and the external electrode, a contact area between the internal electrode and a conductive metal of the external electrode may be decreased, such that contact resistance between the internal electrode and the external electrode may be increased, and equivalent series resistance (ESR) of a multilayer ceramic electronic component may be increased.

According to an exemplary embodiment of the present disclosure, the external electrodes 131 and 132 contain the conductive ceramic powder 30b, such that the sintering rate of the external electrode may be decreased, and defects in which contact resistance between the internal electrodes 121 and 122 and the external electrodes 131 and 132 is increased may be solved.

It is preferable that conductivity of the conductive ceramic powder 30b may be 100 S/cm or more in order to decrease contact resistance. The conductive ceramic powder 30b may contain one or more of indium tin oxide (ITO), lanthanum-doped strontium titanate (SLT), and yttrium-doped strontium titanate (SYT), but is not limited thereto.

According to an exemplary embodiment of the present disclosure, the external electrodes 131 and 132 may contain the conductive ceramic powder 30b in an amount of 3 wt % to 20 wt %. In the case in which the content of the conductive ceramic powder contained in the external electrode is less than 3 wt %, an effect of delaying the sintering of the external electrode may be insignificant, such that a delamination defect of the external electrode may occur, and in the case in which the content of the conductive ceramic powder contained in the external electrode is greater than 20 wt %, contact resistance between the internal electrode and the external electrode may be increased.

The conductive ceramic powder 30b contained in the multilayer ceramic electronic component according to an exemplary embodiment of the present disclosure has conductivity, but since the conductive ceramic powder has a level of conductivity lower than that of the metal and may increase resistance due to grain boundaries formed between the metal and the ceramic powder, the external electrodes 131 and 132 may contain the conductive ceramic powder in an amount of 20 wt % or less.

Although not shown, a conductive resin layer containing conductive particles and an epoxy resin may be selectively disposed on the external electrodes 131 and 132.

In addition, a plating layer containing tin may be selectively formed on the external electrodes in order to improve adhesive properties with solder at the time of mounting the multilayer ceramic electronic component on a board.

For example, the conductive resin layer may be disposed on the external electrodes 131 and 132, and the plating layer may be formed on the conductive resin layer.

In the multilayer ceramic electronic component according to an exemplary embodiment of the present disclosure, the external electrodes may contain the conductive ceramic powder, such that densification of external electrodes may be implemented, and an increase in the contact resistance between the internal electrode and the external electrode may be suppressed.

A paste for an external electrode according to another exemplary embodiment of the present disclosure may contain a metal powder; a conductive ceramic powder, and a glass frit.

The external electrode of the multilayer ceramic electronic component as described above may be formed of the paste for an external electrode according to the present exemplary embodiment. That is, the paste for an external electrode according to the present exemplary embodiment may be a paste for forming the external electrode of the multilayer ceramic electronic component as described above.

In describing the paste for an external electrode according to the present exemplary embodiment, a description overlapped with the description of the external electrode of the multilayer ceramic electronic component as described above will be omitted or briefly provided, and a difference therebetween will be mainly described.

The metal powder contained in the paste for an external electrode may be formed of nickel (Ni), copper (Cu), palladium (Pd), gold (Au), silver (Ag), or an alloy thereof, but the present disclosure is not limited thereto.

The glass frit may be contained in order to densify the external electrode. The glass component may contain $SiO_2$ based glass, $B_2O_3$ based glass, or both of the $SiO_2$ based glass and $B_2O_3$ based glass, but is not limited thereto.

Electrical conductivity of the conductive ceramic powder may be 100 S/cm or more.

According to an exemplary embodiment of the present disclosure, a particle size of the conductive ceramic powder may be 50 nm to 400 nm.

In the case in which the particle size of the conductive ceramic powder in the paste for an external electrode is less than 50 nm, a debindering reaction may be hindered at the time of sintering the external electrode, thereby causing defects such as an electrode defect, or the like. In the case in which the particle size of the conductive ceramic powder is greater than 400 nm, intervals between metal powder particles contained in the paste for an external electrode may be increased, thereby hindering densification of the external electrode.

The conductive ceramic powder may be contained in an amount of 3 wt % to 20 wt % based on the total amount of the metal powder, the glass frit, and the conductive ceramic powder.

The conductive ceramic powder may contain one or more of indium tin oxide (ITO), lanthanum-doped strontium titanate (SLT), and yttrium-doped strontium titanate (SYT).

The paste for an external electrode may further contain a solvent for adjusting viscosity if necessary.

Figure 4:
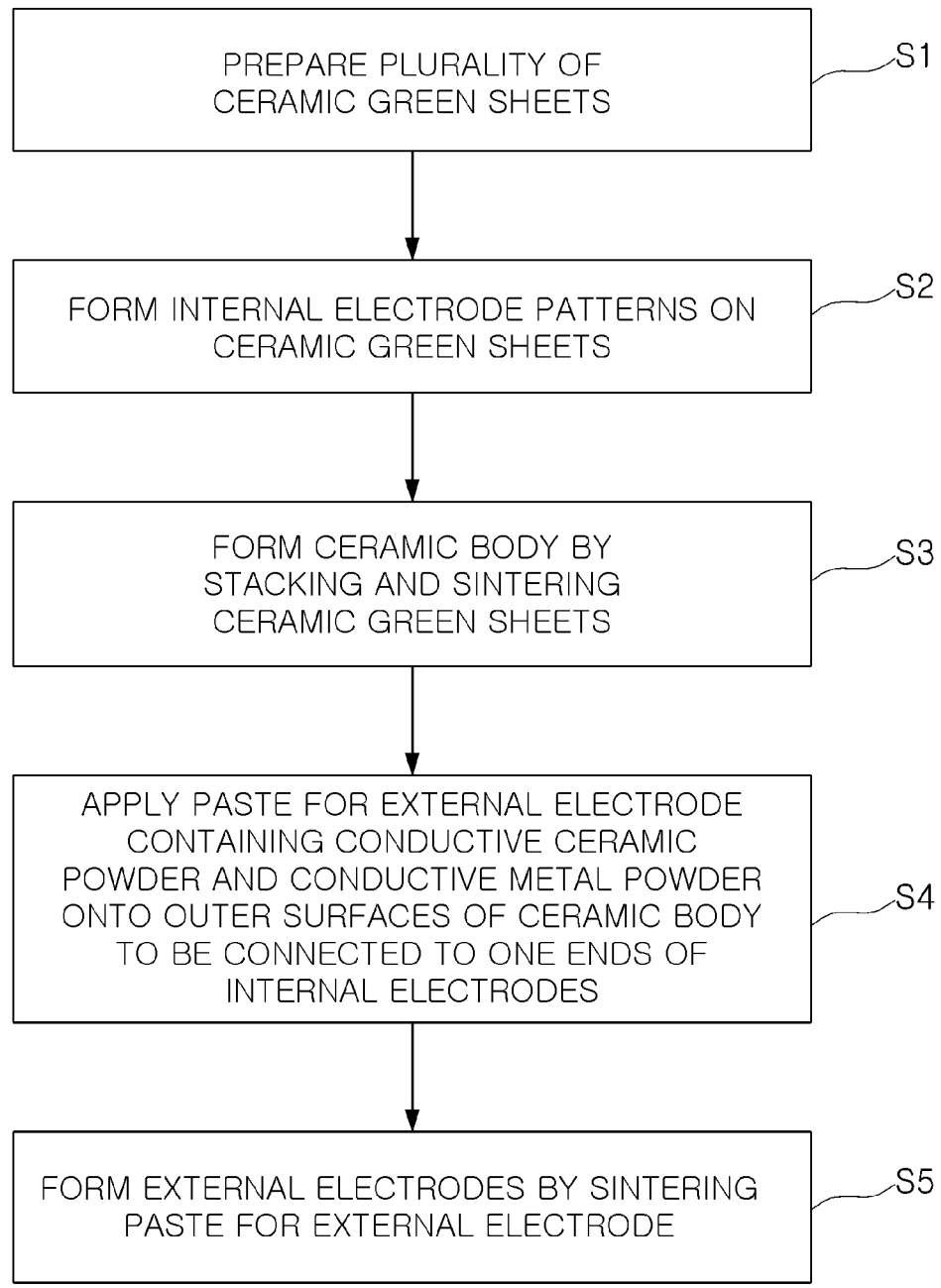
FIG. 4 is a flow chart showing a method of manufacturing a multilayer ceramic electronic component according to an exemplary embodiment of the present disclosure.

FIG. 4 is a flowchart showing a method of manufacturing a multilayer ceramic electronic component according to an exemplary embodiment of the present disclosure.

Referring to FIG. 4, a method of manufacturing a multilayer ceramic electronic component according to an exemplary embodiment of the present disclosure may include: preparing a plurality of ceramic green sheets (S1); forming internal electrode patterns on the ceramic green sheets (S2); forming a ceramic body (S3); applying a paste for an external electrode onto outer surfaces of the ceramic body (S4); and forming an external electrode (S5).

The preparing of the plurality of ceramic green sheets (S1) may be performed by applying slurry containing a dielectric powder to carrier films and drying the same.

The forming of the internal electrode patterns (S2) may be performed by printing a paste for an internal electrode onto the ceramic green sheets, but a method of forming the internal electrode patterns is not limited thereto.

The forming of the ceramic body (S3) may be performed by stacking the ceramic green sheets on which the internal electrode patterns are formed, stacking the ceramic green sheets on which the internal electrode patterns are not formed on upper and lower portions of the stacked ceramic green sheets in order to form cover layers to forma ceramic multilayer body, and then sintering the ceramic multilayer body.

The method may further include, before a sintering process, compressing the multilayer body, and cutting the compressed multilayer body so that one ends of the internal electrode patterns are alternately exposed to cut surfaces.

The applying of the paste for an external electrode onto the outer surfaces of the ceramic body (S4) may be performed using the above-mentioned paste for an external electrode according to another exemplary embodiment of the present disclosure. Application of the paste for an external electrode may be performed by dipping the ceramic body into the paste for an external electrode, but is not limited thereto.

Then, the forming of the external electrodes (S5) may be performed by sintering the paste for an external electrode applied onto the ceramic body.

Experimental Example

The following Table 1 shows data obtained by observing an electrode delamination defect rate and a contact defect rate of an external electrode depending on a content of a conductive ceramic powder contained in the external electrode.

In the present Experimental Example, ceramic bodies each having a size of about 1.0 mm×0.5 mm×0.5 mm (length×width×thickness (L×W×T), a 1005 size, a tolerance range of ±0.2 mm) were used. In the present Experimental Example, each thickness of the internal electrodes was 1.2 μm, the number of stacked internal electrodes was about 200, and one end portions of the internal electrodes were exposed to both side surfaces of the ceramic body in a length direction.

The external electrode was formed using a paste for an external electrode containing a copper powder having a particle size of about 500 nm as a conductive metal, indium tin oxide (ITO) having a particle size of about 100 nm as a conductive ceramic powder, and a glass frit having a particle size of about 1 μm, and indium tin oxide (ITO) was contained in the paste for an external electrode to have contents shown in the following Table 1 in the formed external electrode.

A weight ratio of the contained copper powder and glass frit was about 90:10.

The external electrode was formed to have a thickness of about 35 μm by applying and sintering the paste for an external electrode onto the ceramic body.

In the following Table 1, the electrode delamination defect rate was measured by observing the number of multilayer ceramic electronic components in which a delamination defect occurs at an interface between the ceramic body and the external electrode after sintering the external electrode among 100 multilayer ceramic electronic components, and the contact defect rate was measured by observing the number of multilayer ceramic electronic component of which implemented capacitance was less than 90% of the designed capacitance among 100 multilayer ceramic electronic component.

TABLE 1

| Sample | Content of Conductive ceramic powder | Electrode Delamination Defect Rate (ea/ea) | Contact Defect Rate (ea/ea) |
| --- | --- | --- | --- |
| 1* | 0 | 25/100 | 0/100 |
| 2* | 1 | 12/100 | 0/100 |
| 3* | 2 | 4/100 | 0/100 |
| 4 | 3 | 0/100 | 0/100 |
| 5 | 4 | 0/100 | 0/100 |
| 6 | 5 | 0/100 | 0/100 |
| 7 | 6 | 0/100 | 0/100 |
| 8 | 7 | 0/100 | 0/100 |
| 9 | 8 | 0/100 | 0/100 |
| 10 | 9 | 0/100 | 0/100 |
| 11 | 10 | 0/100 | 0/100 |
| 12 | 11 | 0/100 | 0/100 |
| 13 | 12 | 0/100 | 0/100 |
| 14 | 13 | 0/100 | 0/100 |
| 15 | 14 | 0/100 | 0/100 |
| 16 | 15 | 0/100 | 0/100 |
| 17 | 16 | 0/100 | 0/100 |
| 18 | 17 | 0/100 | 0/100 |
| 19 | 18 | 0/100 | 0/100 |
| 20 | 19 | 0/100 | 0/100 |
| 21 | 20 | 0/100 | 0/100 |
| 22* | 21 | 0/100 | 3/100 |
| 23* | 22 | 0/100 | 4/100 |
| 24* | 23 | 0/100 | 6/100 |
| 25* | 24 | 0/100 | 6/100 |
| 26* | 25 | 0/100 | 7/100 |
| 27* | 26 | 0/100 | 10/100 |
| 28* | 27 | 0/100 | 13/100 |
| 29* | 28 | 0/100 | 12/100 |
| 30* | 29 | 0/100 | 15/100 |
| 31* | 30 | 0/100 | 19/100 |

*indicates Comparative Examples.

Referring to Table 1, it may be confirmed that in the case of samples 1 to 3 in which the content of the conductive ceramic powder contained in the external electrode was less than 3 wt %, the electrode delamination defect occurred, and in the case of samples 22 to 31 in which the content of the conductive ceramic powder contained in the external electrode was greater than 20 wt %, the contact defect of the external electrode occurred, such that the capacitance implementation rate was decreased.

As set forth above, according to exemplary embodiments of the present disclosure, the paste for an external electrode capable of forming the external electrode having excellent electrical properties, the multilayer ceramic electronic component having excellent electrical properties, and the method of manufacturing the same may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
  a ceramic body including a plurality of dielectric layers;
  internal electrodes disposed in the ceramic body and having one ends exposed to outer surfaces of the ceramic body; and
  external electrodes disposed on the outer surfaces of the ceramic body to be connected to the respective one ends of the internal electrodes and containing a conductive metal, a conductive ceramic powder having a conductivity of 100 S/cm or more and a glass component,
  wherein the conductive ceramic powder is included in an amount of 3 wt % to 20 wt % based on a total amount of the conductive metal, the conductive ceramic powder, and the glass component.

2. The multilayer ceramic electronic component of claim 1, wherein the conductive ceramic powder contains one or more of indium tin oxide (ITO), lanthanum-doped strontium titanate (SLT), and yttrium-doped strontium titanate (SYT).

3. A method of manufacturing a multilayer ceramic electronic component, the method comprising:
  preparing a plurality of ceramic green sheets;
  forming internal electrode patterns on the ceramic green sheets;
  forming a ceramic body in which dielectric layers and internal electrodes are alternately stacked, by stacking and sintering the ceramic green sheets;
  applying a paste for an external electrode containing a conductive ceramic powder having a conductivity of 100 S/cm or more, a conductive metal powder and a glass frit to outer surfaces of the ceramic body to be connected to one ends of the internal electrodes; and
  forming external electrodes by sintering the paste for an external electrode, wherein the conductive ceramic powder is included in an amount of 3 wt % to 20 wt % based on a total amount of the metal powder, the conductive ceramic powder, and the glass frit.

4. The method of claim 3, wherein the conductive ceramic powder contains one or more of indium tin oxide (ITO), lanthanum-doped strontium titanate (SLT), and yttrium-doped strontium titanate (SYT).

5. The method of claim 3, wherein a particle size of the conductive ceramic powder is 50 nm to 400 nm.

6. A paste for an external electrode comprising:
a conductive metal powder;
a conductive ceramic powder having conductivity of 100 S/cm or more; and
a glass frit,
wherein the conductive ceramic powder is included in an amount of 3 wt % to 20 wt % based on a total amount of the metal powder, the conductive ceramic powder, and the glass frit.

7. The paste for an external electrode of claim 6, wherein the conductive ceramic powder contains one or more of indium tin oxide (ITO), lanthanum-doped strontium titanate (SLT), and yttrium-doped strontium titanate (SYT).

* * * * *